(No Model.)

M. F. McMAHON & T. F. CARVER.
CLUTCH.

No. 520,447. Patented May 29, 1894.

Witnesses.
Wm. Burleigh
Ella P. Blenus.

Inventors.
Michael F. McMahon
Thomas F. Carver
By Chas. H. Burleigh
Attorney

THE NATIONAL LITHOGRAPHING COMPANY,
WASHINGTON, D. C.

UNITED STATES PATENT OFFICE.

MICHAEL F. McMAHON AND THOMAS F. CARVER, OF WORCESTER, MASSACHUSETTS; SAID CARVER ASSIGNOR TO SAID McMAHON.

CLUTCH.

SPECIFICATION forming part of Letters Patent No. 520,447, dated May 29, 1894.

Application filed September 11, 1893. Serial No. 485,232. (No model.)

*To all whom it may concern:*

Be it known that we, MICHAEL F. MCMAHON and THOMAS F. CARVER, citizens of the United States, residing at Worcester, in the county of Worcester and State of Massachusetts, have invented a new and useful Clutch Mechanism for Shafting, Pulleys, &c., of which the following, together with the accompanying drawings, is a specification sufficiently full, clear, and exact to enable persons skilled in the art to which this invention appertains to make and use the same.

Figure 1:
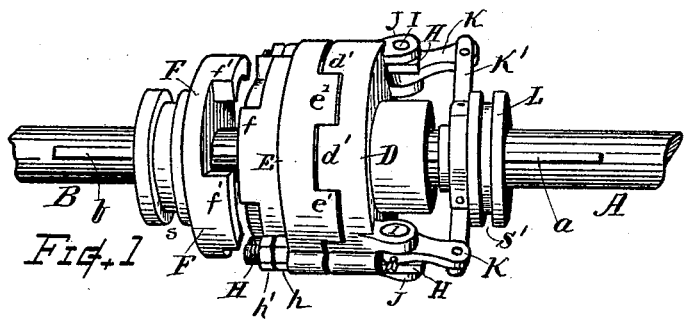
Figure 2:
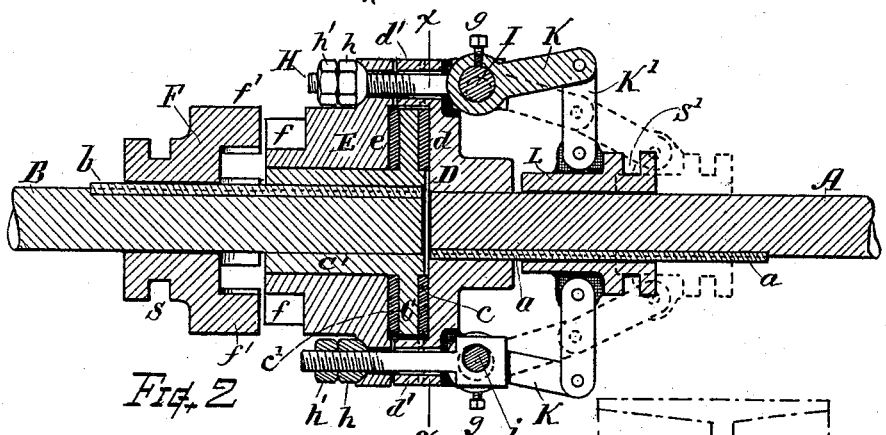
Figures 3, 4, 5:
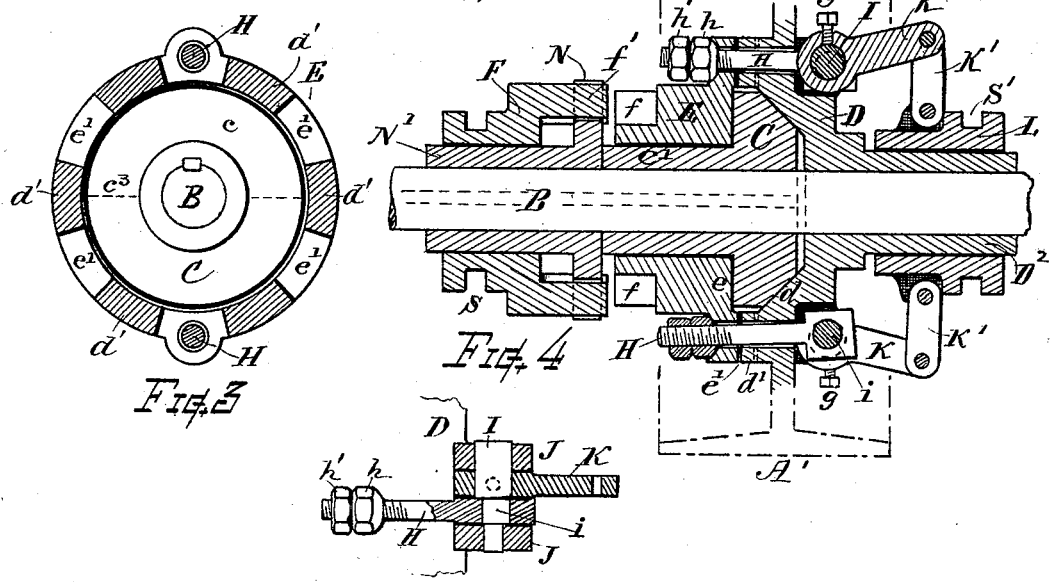

Figure 1 is a perspective view of a clutch mechanism embodying our invention as applied for connecting and disconnecting adjacent ends of shafting. Fig. 2 is a central longitudinal section of the same. Fig. 3 is a transverse section at line $x$ $x$. Fig. 4 is a longitudinal section showing modifications in construction, which may be employed in some instances, and Fig. 5 shows the rock-shaft and eccentric or devices for advancing and retracting the frictional contact surfaces.

The object of our present invention is to provide an efficient clutch mechanism applicable to quick-speeded shafts and pulleys, or other machinery, and combining the features and benefits of both a frictional and a positive clutch. Also, to provide a clutch mechanism having frictionally engaging and positive tooth engaging devices successively brought into action, in the manner set forth, whereby the clutched or driven mechanism is primarily started and accelerated to normal speed by frictional engagement, and the regular transmission of working power and motion then continued by positive interlocking-tooth engagement, as more fully hereinafter explained.

Referring to parts, A and B indicate the shafts intended to be connected and disconnected by our clutch mechanism. Said shafts are disposed with ends adjacent and axially in line with each other. Either shaft or part may be the driver or the driven, as preferred; but in this specification it is assumed that the power and motion is transmitted from shaft A to shaft B.

C indicates a friction disk or member mounted upon and keyed to the shaft B, and provided with frictionally engaging surfaces at its opposite sides. The friction faces are best formed of or faced with loose annular plates $c$ $c'$ of hard wood, vulcanized fiber, bronze or other material suitable to prevent cutting of the faces and affording a firm frictional engagement or grip of contact. In some instances the plates $c c'$ may be omitted; said plates can in other instances be formed in sections or semi-circular parts, as indicated by dotted line $C^3$ Fig. 3.

D indicates a clutch-head or disk arranged upon the end of the shaft A and rigidly keyed thereto by a spline $a$, or otherwise, to rotate with said shaft.

E indicates an intermediate clutch sleeve or member mounted loose upon the hub $C'$ of the friction disk C, and having on its outer end suitable teeth $f$ that positively interlock with corresponding teeth $f'$ on a sliding clutch or member F mounted on the shaft B and confined to rotate therewith by a spline $b$ or other suitable means, but free to slide endwise thereon under control of a shifter of any suitable kind; said shifter engaging in the groove S in well known manner. The head D and the clutch-sleeve E are each fitted on their side with a friction surface, as at $d$ and $e$ for embracing and engaging by their frictional contact the disk C. The members E and D extend beyond the periphery of the disk C and their rims are laterally intermatched with each other by a series of alternate oppositely projecting detents or lugs $d'$ and $e'$ that prevent independent rotative motion between the head D and sleeve E, while allowing sufficient endwise movement for gripping and releasing the disk C.

For forcing together the friction surfaces, the head D and sleeve E are connected by draft rods H, two or more as may be desired, which pass through suitable openings near their peripheries, parallel with the axis of the shafts. The rods H are fitted at one end with an eye or bearing that works in conjunction with an eccentric $i$ formed on a short rocker-shaft or pin-axle I mounted in transverse position in lugs or bearing ears J fixed to the outer portion of the head D, as indicated. The opposite ends of the rods H are screw-threaded and provided with nuts $h$ $h'$ thereon, whereby the working length of connection can be adjusted for regulating the pressure applied to the friction surfaces. The nut $h$ is best fitted to the rim of the sleeve E by a spherical seating surface or round bearing so as to allow slight oscillative action of the rods without yielding at their hold or draft.

Each of the draft devices is provided with an operating lever or arm K fixed to the eccentric $i$, or its shaft I adjacent to the end of the rod H, by a set-screw $g$ or other efficient means, and the outer ends of the several arms are connected by toggles or links K' with a sliding collar L mounted on the shaft A; or if preferred on an extended portion $D^2$ of the hub of head D. The movement of the collar L back and forth along the shaft is effected by a shifter of any suitable kind; said shifter engaging in the groove S' in well known manner. An inward movement of the collar L throws outward the arms K thereby rocking the shafts I and the eccentric portion $i$ draws inward the rods H causing the friction surfaces $e$ and $d$ to clutch the disk C.

In some instances a guide-disk N is employed (see Fig. 4) for sustaining the wear and pressure of the parts and distributing the strains over greater surface than is afforded when simply a spline is used. In this construction the guide-disk N has a long hub N' that is fixed to the shaft B, in any efficient manner, and the clutch F is arranged to slide on said hub, while its clutching lugs or teeth pass through recesses at the periphery of the disk N for engagement with the teeth $f$ on the end of the sleeve or member E.

The disk C and inner face of the head D can, when desired, be formed conical (see Fig. 4). This form serves to bring the parts into common central relation when the friction surfaces are forced together, and to correct any slight variation in axial alignment that may exist between the shafts A and B when unclutched.

The operation is as follows:—Assuming the shaft A to be rotating and the shaft B to be at rest, with the collar L standing at the position indicated by dotted lines Fig. 2. Then upon shifting the collar L to the position shown in full lines the arms K are thrown outward operating the rock-shafts I with their eccentrics $i$ and the connecting rods H, thereby forcing the head D and sleeve E toward each other and causing their frictional-grip surfaces to engage the surfaces of the disk C, thus frictionally clutching said disk between the rotating head D and sleeve E, and starting into motion the shaft B and mechanism connected therewith, and also by the frictional clutch of the parts, accelerating such motion until the speed of the shaft B equals or approximates that of the shaft A at whatever high degree of speed said shaft may rotate. When the rotative speed of the two parts is approximately the same the positive interlocking tooth slide F can, without shock or injury, be readily moved into interlocking engagement with the detents on the end of the sleeve E, thus affording for the normal working a positive clutch connection for the transmittal of the power and motion to the operated machinery. If the ends of the lugs or teeth $f$ and $f'$ strike against each other when the slide F is first moved forward the friction-grip may be eased off sufficiently to give a slight variation in the rotation of the two shafts, and the parts E and F will instantly be brought into such relation that their teeth will interlock. By providing the rims of the head D and sleeve E with the oppositely projecting intermatching detents $d'$ and $e'$ the stress of the transmitted power is borne by the adjacent shoulders of the detents, the rods H being thus relieved from any sidewise strain that might otherwise interfere with the free action of the clutch-operating devices.

For adaptation of this clutch mechanism to a pulley running upon a shaft, assume the shafts A and B to be one shaft extending through the entire length, and assume the member D to be the hub or center of the pulley and to turn loose upon the shaft with the collar L mounted on an extension of its hub, as indicated in Fig. 4. All other parts and the operation will then be substantially as above described.

We claim as our invention herein, to be secured by Letters Patent—

1. The combination substantially as described, of the frictional-clutch-head fixed on the prime shaft, the friction disk fixed on the second shaft, the intermediate clutch-sleeve, mounted loose upon the friction-disk-hub, and having the positive engaging teeth and a frictional engaging face at its respective ends, the endwise movable toothed clutch-slide arranged on and keyed to said second shaft, for positively engaging with the toothed end of said sleeve, the draft-rods connecting said sleeve and head, and means substantially as described for moving the clutching parts into and out of engagement, as set forth.

2. The frictional clutch-head D and clutch-sleeve E comprising a positive and a frictionally engaging face, said head and sleeve having their rims fitted together with opposite laterally projecting intermatching lugs or detents $d'$ and $e'$, respectively formed integral with said head and said sleeve, the adjacent portions alternately interlocking outside the periphery of the friction-disk and beyond the circle of the frictional contact-faces; in combination with the positively engaging clutch-slide, the friction-disk embraced between said head and sleeve, the draft-rods connecting their rims, and means, substantially as described, for tightening and releasing said draft-rods, as set forth.

3. In a clutch mechanism for the purpose specified, the combination of the frictional clutch-head carried by the shaft or pulley, and having a frictional contact face and a surrounding rim with transverse bearings thereon, the shifter collar mounted upon the shaft or hub adjacent thereto, the friction disk matching said head, rigidly keyed upon the second shaft, the loose clutch sleeve provided at one end with a friction face adjacent to said disk and at its other end with positive clutching teeth, a toothed sliding clutch rotatively confined on said second shaft and engaging with said sleeve, the adjustable draft-rods disposed through the rims of said sleeve and head, the rock-shafts having eccentrics for operating said rods, and the arms and links connecting said rock-shafts with the shifter-collar, as set forth.

Witness our hands this 5th day of September, A. D. 1893.

MICHAEL F. McMAHON.
THOMAS F. CARVER.

Witnesses:
CHAS. H. BURLEIGH,
ELLA P. BLENUS.